United States Patent
Moore et al.

(10) Patent No.: US 10,691,500 B1
(45) Date of Patent: Jun. 23, 2020

(54) MODELING WORKLOADS USING MICRO WORKLOADS REPRESENTING NORMALIZED UNITS OF RESOURCE CONSUMPTION METRICS

(71) Applicant: Virtustream IP Holding Company LLC, Bethesda, MD (US)

(72) Inventors: Kenneth Moore, Cork (IE); John Yani Arrasjid, Boulder Creek, CA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 67 days.

(21) Appl. No.: 16/213,192

(22) Filed: Dec. 7, 2018

(51) Int. Cl.
| | |
|---|---|
| *G06F 9/46* | (2006.01) |
| *G06F 9/50* | (2006.01) |
| *G06F 9/48* | (2006.01) |
| *G06F 9/455* | (2018.01) |
| *G06F 11/34* | (2006.01) |

(52) U.S. Cl.
CPC .......... *G06F 9/5077* (2013.01); *G06F 9/4881* (2013.01); *G06F 9/505* (2013.01); *G06F 9/5011* (2013.01); *G06F 9/5027* (2013.01); *G06F 11/3442* (2013.01); *G06F 2009/4557* (2013.01); *G06F 2209/5019* (2013.01)

(58) Field of Classification Search
CPC .... G06F 9/5011; G06F 9/5077; G06F 9/5027; G06F 2209/5019; G06F 2009/4557; G06F 11/3442; G06F 9/505; G06F 9/4881
See application file for complete search history.

(56) References Cited

U.S. PATENT DOCUMENTS

| | | | |
|---|---|---|---|
| 8,255,915 B1 * | 8/2012 | Blanding | G06F 9/5027 718/104 |
| 10,120,727 B2 * | 11/2018 | Bartfai-Walcott | G06F 9/5027 |

(Continued)

OTHER PUBLICATIONS

E. Mikuszewski, "What is Platform 1-3?" DellEMC Blog, (online), https://community.emc.com/people/mikuszed/blog/2014/01/05/what-is-platform-1-3, Jan. 21, 2014, 2 pages.

(Continued)

*Primary Examiner* — Tuan A Vu
(74) *Attorney, Agent, or Firm* — Ryan, Mason & Lewis, LLP

(57) ABSTRACT

A method includes selecting a given workload associated with at least one application type, and analyzing the given workload to determine a set of functional patterns describing resource structures for implementing functionality of the at least one application type. The method also includes determining resource consumption demand profiles for each of the set of functional patterns and determining micro workload distributions for each of the resource consumption demand profiles, a given one of the micro workload distributions comprising a number of micro workloads, each micro workload comprising a normalized unit of resource consumption metrics. The method further includes converting the micro workload distributions for each of the resource consumption demand profiles into a set of resource requirements for running the given workload on an information technology infrastructure, and allocating resources of the information technology infrastructure to the given workload based on the set of resource requirements.

20 Claims, 7 Drawing Sheets

(56) References Cited

U.S. PATENT DOCUMENTS

| | | | | |
|---|---|---|---|---|
| 2011/0131431 A1* | 6/2011 | Akers | ................... | G06F 9/5027 |
| | | | | 713/320 |
| 2011/0145657 A1* | 6/2011 | Bishop | ................ | G06F 11/3495 |
| | | | | 714/47.1 |
| 2013/0185433 A1* | 7/2013 | Zhu | ..................... | H04L 43/0882 |
| | | | | 709/226 |
| 2013/0185729 A1* | 7/2013 | Vasic | ................... | G06F 9/5072 |
| | | | | 718/104 |
| 2017/0116012 A1* | 4/2017 | Cropper | ............. | G06F 9/45558 |

OTHER PUBLICATIONS

S. Narkier et al., "Application Types Explained," Adaptivity (Dell-EMC), powerpoint presentation, Feb. 2012, 30 pages.

virtustream.com, "The New Measure of Cloud Performance," https://www.virtustream.com/software/micro-vms, 2018, 9 pages.

U.S. Appl. No. 15/386,761 filed in the name of David Stephen Reiner et al. filed Dec. 21, 2016 and entitled "Processing Platform with Metric Mapping for Interoperability of Multiple Distinct Models.".

* cited by examiner

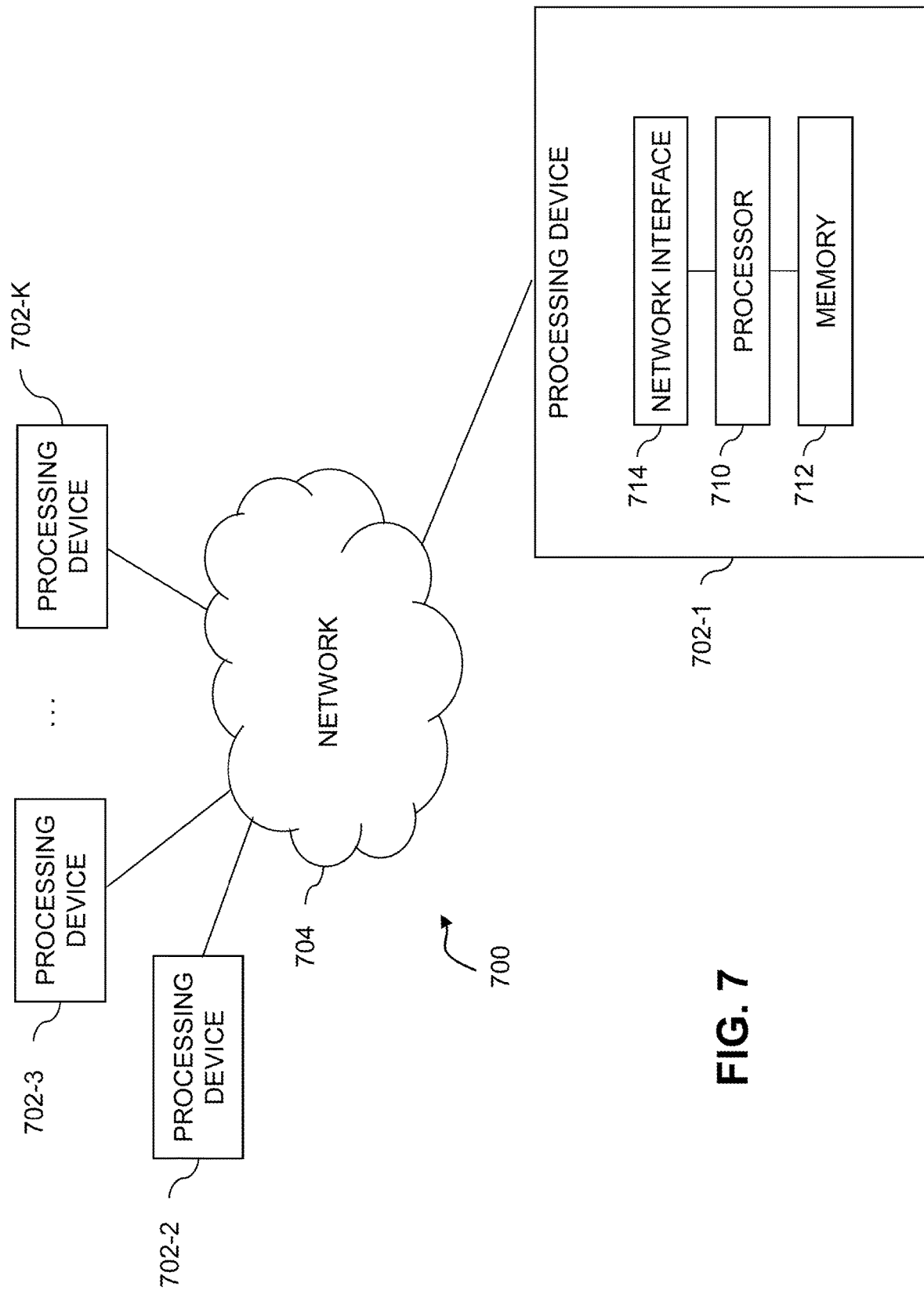

MODELING WORKLOADS USING MICRO WORKLOADS REPRESENTING NORMALIZED UNITS OF RESOURCE CONSUMPTION METRICS

FIELD

The field relates generally to information processing systems, and more particularly to managing computing resources in such systems.

BACKGROUND

Advanced forms of information technology (IT) infrastructure, including but not limited to cloud computing platforms, converged infrastructure (CI) platforms, software defined data centers (SDDCs), distributed infrastructure, and other types of processing platforms, are increasing in availability and usage. Management of such IT infrastructure by users, such as customers, companies, businesses, organizations or other enterprises, is a complex task. As IT infrastructure expands and new platforms, software, and other IT resources are released and become available or incorporated into such IT infrastructure, the complex task of IT management is increasingly difficult and costly.

SUMMARY

Illustrative embodiments of the invention provide techniques for modeling workloads in terms of micro workloads representing normalized units of resource consumption metrics, and for utilizing micro workloads to allocate resources for running workloads on information technology infrastructure.

In one embodiment, a method comprises selecting a given workload, the given workload being associated with at least one application type, and analyzing the given workload to determine a set of functional patterns, the set of functional patterns describing resource structures for implementing functionality of the at least one application type. The method also comprises determining resource consumption demand profiles for each of the set of functional patterns and determining micro workload distributions for each of the resource consumption demand profiles, a given one of the micro workload distributions comprising a number of micro workloads, each micro workload comprising a normalized unit of resource consumption metrics. The method further comprises converting the micro workload distributions for each of the resource consumption demand profiles into a set of resource requirements for running the given workload on an information technology infrastructure and allocating resources of the information technology infrastructure to the given workload based on the set of resource requirements. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIGS. 6 and 7 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
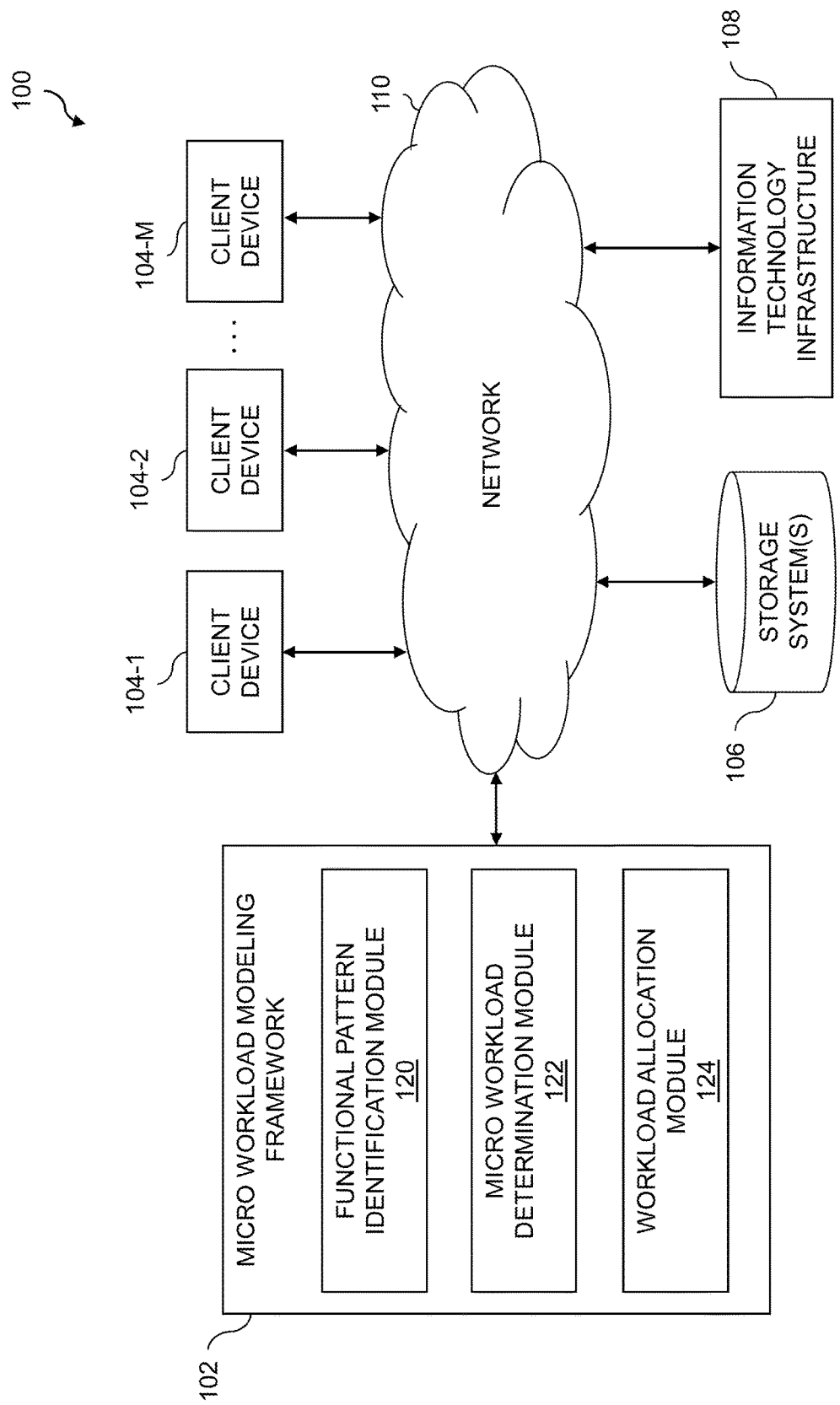
FIG. 1 shows an information processing system configured for micro workload modeling in an illustrative embodiment of the invention.

FIG. 1 shows an information processing system 100 configured in accordance with an illustrative embodiment. The information processing system 100 is assumed to be built on at least one processing platform and provides functionality for modeling workloads as a set of micro workloads ("µWorkloads") utilizing micro workload modeling framework 102. µWorkloads, as will be described in further detail below, are a normalized unit of resource consumption metrics. An overall workload may be represented as a number of µWorkloads, where the µWorkloads represent a designated basic level of resource consumption. The resource consumption may refer to hardware resource consumption, software resource consumption, or combinations thereof.

The micro workload modeling framework 102 may provide such functionality for workloads running on an information technology (IT) infrastructure 108, such as workloads submitted by users of client devices 104-1, 104-2, . . . 104-M (collectively, client devices 104). The IT infrastructure 108 may comprise a cloud computing infrastructure, a software defined data center (SDDC), a physical infrastructure, etc.

The micro workload modeling framework 102 may utilize various information stored in storage systems 106 for use in modeling workloads in the form of µWorkloads, such as information regarding infrastructure workload metrics, application types, application functional patterns, etc. The storage systems 106 may comprise one or multiple different storage systems which collectively provide one or more databases or other repositories of information for use by the micro workload modeling framework 102. Although shown as separate in FIG. 1, in some embodiments at least a portion of the storage systems 106 may be part of the IT infrastructure 108 or the micro workload monitoring framework 102. Also, the micro workload monitoring framework 102 may be implemented at least in part internally to the IT infrastructure 108 in some embodiments.

The client devices 104 may comprise, for example, mobile telephones, laptop computers, tablet computers, desktop computers or other types of devices utilized by users or members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The micro workload modeling framework 102, client devices 104, storage systems 106 and IT infrastructure 108 may be connected via at least one network 110. The network 110 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The micro workload monitoring framework 102 implements a number of functional modules for workload modeling and allocating resources of IT infrastructure 108 to workloads, including a functional pattern identification module 120, a micro workload determination module 122, and a workload allocation module 124.

The functional pattern identification module 120 is configured to analyze a given workload to determine a set of functional patterns describing resource structures for implementing functionality of the given workload. This may be done in some embodiments by determining an application type of the given workload, and by mapping the given workload to one or more known applications. The micro workload determination module 122 is configured to determine resource consumption demand profiles for each of the set of functional patterns, and to determine micro workload distributions for each of the resource consumption demand profiles. The micro workload distributions may comprise respective numbers of micro workloads, with each micro workload comprising a normalized unit of resource consumption metrics. The workload allocation module 124 is configured to convert the micro workload distributions for each of the resource consumption demand profiles into a set of resource requirements for running the given workload on IT infrastructure 108, and to allocate resources of the IT infrastructure 108 to the given workload based on the set of resource requirements.

It is to be appreciated that the particular arrangement of the micro workload modeling framework 102, client devices 104, storage systems 106 and IT infrastructure 108 illustrated in the FIG. 1 embodiment is presented by way of example only, and alternative arrangements can be used in other embodiments. As an example, the functionality associated with the functional pattern identification module 120, the micro workload determination module 122, and the workload allocation module 124 may in some embodiments be combined into fewer modules, or may be separated across more modules, with the multiple modules possible being implemented with multiple distinct processors or processing devices. As another example, the micro workload modeling framework 102 and/or storage systems 106 may be implemented at least in part within the IT infrastructure 108.

At least portions of the functional pattern identification module 120, the micro workload determination module 122, and the workload allocation module 124 may be implemented at least in part in the form of software that is stored in memory and executed by a processor.

Figure 2:
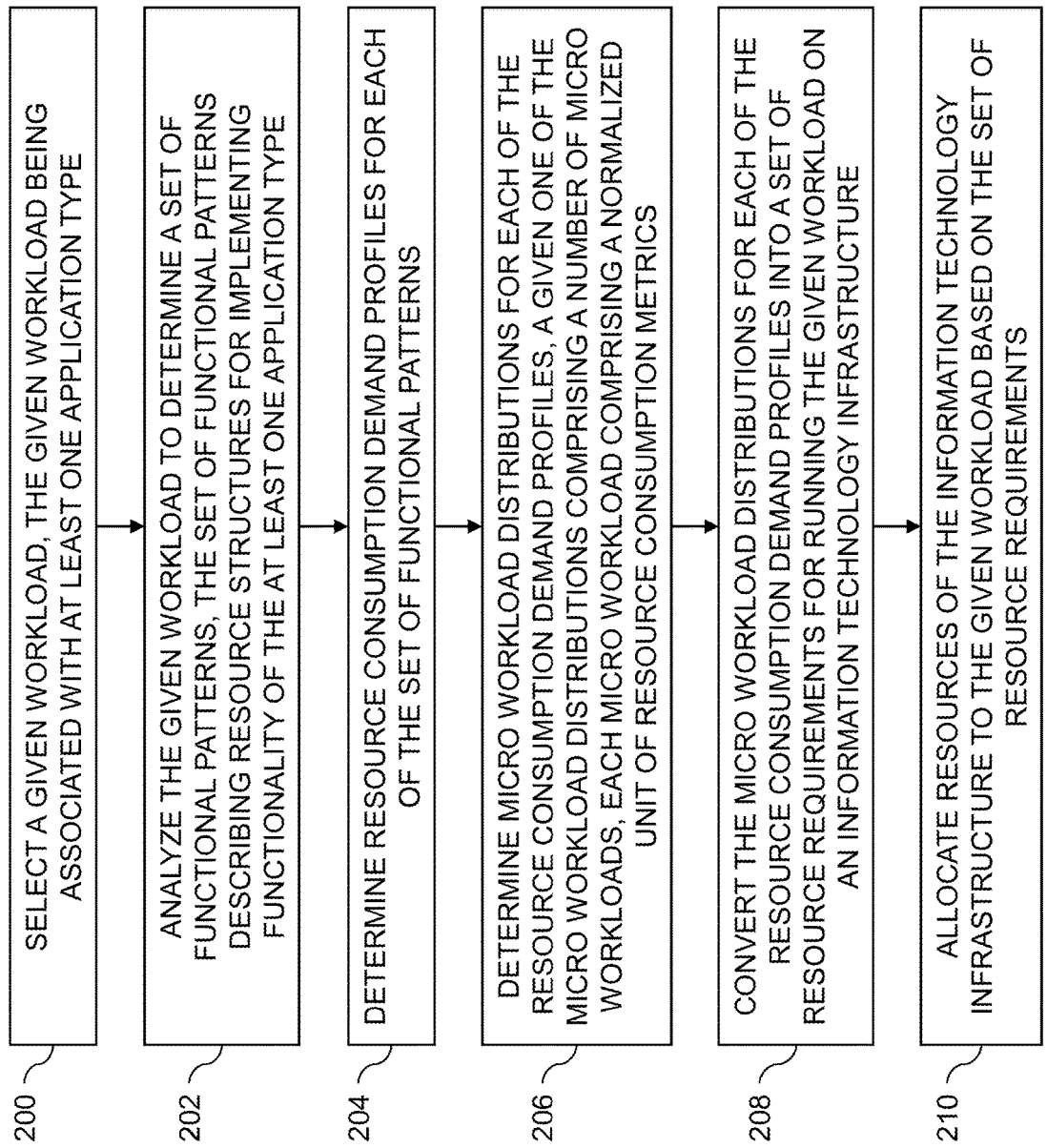
FIG. 2 is a flow diagram of an exemplary process for modeling of micro workloads and associated resource consumption in an illustrative embodiment.

An exemplary process for micro workload modeling and resource allocation will now be described in more detail with reference to the flow diagram of FIG. 2. It is to be understood that this particular process is only an example, and that additional or alternative processes for micro workload modeling and resource allocation can be carried out in other embodiments.

In this embodiment, the process includes steps 200 through 210. These steps are assumed to be performed by the micro workload modeling framework 102 utilizing the functional pattern identification module 120, the micro workload determination module 122, and the workload allocation module 124. The process begins with step 200, selecting a given workload. The given workload may be associated with at least one application type. The given workload may be associated with an unknown application, for which historical resource consumption data is not available. The unknown application may comprise a new workload that is built for cloud, social or mobile deployment. Such new workloads are also referred to as Platform-3 (P3) type applications as will be described in further detail below.

In some embodiments, step 200 includes determining the at least one application type utilizing a multi-level hierarchy. The multi-level hierarchy may comprise a first level for known applications, a second level characterizing relationships between the known applications and one or more application types representing functionality of the known applications, and at least a third level characterizing relationships between the one or more application types and a set of functional patterns used within the one or more application types. The application types may include, but are not limited to: business intelligence; collaborative workspaces and portals; enterprise content management and portals; unified communications; customer relationship management; engineering; enterprise resource management; financial; simulation and analytics; supply chain management; real time media streaming; social networking; and stored media streaming distribution. The functional patterns may include, but are not limited to: rich internet application; straight through processing; administrative workflow; content collaboration; content distributor; and numerical processor. Additional details regarding these application types and functional patterns will be provided below. It should be appreciated, however, that embodiments are not limited to use with these application types and functional patterns, and that various other application types and functional patterns may be used. Further, it should be appreciated that additional application types and functional patterns may be identified or determined via monitoring of the given workload and other workloads and applications that run on IT infrastructure.

The process continues with step 202, analyzing the given workload to determine a set of functional patterns. The set of functional patterns describe resource structures for implementing functionality of the at least one application type. For example, the given workload or its associated application may be broken down into workload components describing basic operations of the application or the given workload. Multiple functional patterns may be combined to create an application or the given workload. The different functionality of the given workload or an associated application may be represented as subroutines, microservices or other mechanisms for building an application or workload. Step 202 may include mapping the given workload to a given one of the known applications in the first level of the multi-level hierarchy, and determining the functional patterns by mapping the given known application in the first level of the multi-level hierarchy to at least a given application type in the second level of the multi-level hierarchy and selecting a set of functional patterns in the third level of the multi-level hierarchy associated with the given application type in the second level of the multi-level hierarchy.

In step 204, resource consumption demand profiles are determined for each of the set of functional patterns. Step 204 may include, for a given one of the resource consumption demand profiles, selecting a unit-based resource consumption demand profile and a correction factor for scaling the unit-based resource consumption demand profile to account for a number of units utilized by the given workload. It should be appreciated that the "unit" in this context is not the same as the normalized unit of resource consumption metrics which define a micro workload. Instead, the "unit" may represent a designated number of users of an application or workload, a designated number of transactions or requests in the application or workload, combinations thereof, etc. In some embodiments, the "units" may represent users, such that each unit-based resource consumption demand profile characterizes resource demand for one user utilizing an application or workload, or for some other designated number of users utilizing the application or workload (e.g., 5 users, 10 users, 100 users, etc.). The correction factor scales the user- or other unit-based resource consumption demand profiles to account for resource allocation complexity. For example, where the units represent users, the scaling factor may account for input-output (IO) or other resource contention among users utilizing the application.

In step 206, micro workload distributions for each of the resource consumption demand profiles are determined. Each of the micro workload distributions represents a number of micro workloads. Each micro workload comprises a normalized unit of resource consumption metrics. Thus, the micro workload distributions characterize the resource demand for the different functional patterns in terms of numbers of micro workloads. In some embodiments, the normalized unit of resource consumption metrics may be a collection of normalized units for various different resource types, such as normalized units of compute, storage, memory, memory bandwidth and network bandwidth resource consumption. These normalized units of compute, storage, memory, memory bandwidth and network bandwidth resource consumption are selected to provide a specified average resource utilization (e.g., 70-80% or some other desired average utilization) of compute, storage, memory, memory bandwidth and network bandwidth resources of the IT infrastructure. In this way, allocation of resources in the IT infrastructure for the given workload can strike a desired balance between over- and under-provisioning as described in further detail below.

Step 206 in some embodiments includes mapping the given workload to a given known application, determining micro workload data for the given known application, and applying the micro workload data for the given known application to determine the micro workload distributions for the given workload. Mapping the given workload to the given known application may comprise determining one or more features of the given workload, comparing the one or more features of the given workload with respective sets of features of a set of known applications, and identifying the given known application as a selected one of the set of known applications having a set of features similar to the one or more features of the given workload. Determining the micro workload data for the given known application may comprise calculating micro workload distributions for the given known application from the historical data responsive to determining that historical data exists for the given known application, or deriving micro workload distributions for the given known application from historical data for one or more other known applications determined to be similar to the given known application responsive to determining that historical data does not exist for the given known application.

In step 208, the micro workload distributions for each of the resource consumption demand profiles are converted into a set of resource requirements for running the given workload on the IT infrastructure. Resources of the IT infrastructure are then allocated in step 210 to the given workload based on the set of resource requirements. After allocation in step 210, the given workload may be monitored and the allocation of resources may be adjusted. Further, information related to the given workload and such monitoring may be added to a repository for use in modeling additional workloads.

Cloud service providers may be measured using two key metrics: (i) service level agreement (SLA) efficiency; and (ii) cost efficiency. In many cases, these two metrics may conflict with one another, resulting in either under-provisioned or over-provisioned resources. Under-provisioned resources keep costs low and impact system performance, while over-provisioned resources guarantee performance but impact system cost. In situations where a "managed services" contract is put in place, the task of selecting appropriate resources for provisioning may be left to the cloud service provider. These metrics may play a critical role in the evaluation of the SLA requirements contracted by the customer, and thus also have a significant impact on the potential profit for such contracts. Under-provisioning to save costs can negatively impact performance for the customer and thus break the SLA agreements. Over-provisioning to guarantee the SLA agreements will ensure that the customer is provided with their requirements, but will negatively impact potential profit on such services.

For a managed services provider (e.g., a cloud service provider), there is thus a need to balance these metrics to evaluate resource efficiency. The utilization of resources may be measured against the allocation of resources for a given managed services contract. Poor resource efficiency aimed at guaranteeing SLA agreements in the given managed services contract impacts the potential for allocating unused resources to a different customer, and thus negatively impacts profit potential for the services provided. This may also lead to more general waste of computing resources, including waste of energy and power and is thus undesirable.

Various challenges are faced when provisioning resources for P3 type applications, where the resource sizing is unknown but the managed services provider is still required to provide infrastructure resources capable of managing that P3 workload. P3 type applications or workloads refer to workloads based on the big data era, where new applications and new workloads are built for cloud, social, and mobile deployment and use. This is in comparison with Platform-2 (P2) type applications or workloads, which represent workloads based on client-server and virtualized x86 traditional applications. Some managed services providers may allocate resources in the form of infrastructure units (IUs). Such infrastructure units (IUs) may be referred to as micro virtual machines (μVMs), where μVMs or more generally IUs may be used as the base unit building blocks for managed service contracts. Illustrative embodiments complement the use of IUs or μVMs through modeling workloads in the form of μWorkloads, providing a mechanism for ensuring that resource efficiency for P3 applications can be derived. This may be achieved in some embodiments by breaking a workload down into functional patterns, where such functional patterns are obtained from knowledge and experience learned from other similar known application workloads. Embodiments are thus able to provide mechanisms for optimized resource allocation to unknown workload profiles.

Measuring a workload within a SDDC or other cloud computing infrastructure provides insight into calculating the SDDC resources required to perform a specific task or set of tasks. A workload is the demand required from the SDDC infrastructure components, which enable the infrastructure to perform its duties as demanded by the tasks put upon it. A workload may be measured in terms of various system metrics that describe the operating conditions in relation to the available resources of the system. Examples of infrastructure workload components include aspects of compute components, memory and storage components, network bandwidth, and memory bandwidth. Compute components include central processing units (CPUs), graphical processing units (GPUs), tensor processing units (TPUs), field-programmable gate arrays (FPGAs), application-specific integrated circuits (ASICs), co-processors, etc. Compute components may be viewed as one of three types—traditional (e.g., CPUs), accelerators (e.g., GPUs, TPUs, FPGAs, ASICs) that work independently of a CPU, and co-processors that work in synchronization with a CPU. Memory and storage components include data capacity used during intermediate computations (e.g., memory) and data capacity used during long term residence (e.g., storage). Network bandwidth components include network data transfer capacity, and memory bandwidth components include data transfer capacity between memory and compute components.

When designing SDDC systems, an aim is to create an environment where the typical workload results in resources running at some defined threshold utilization (e.g., 70-80% utilization). This optimal figure allows for normal operation of the system to perform as designed, yet also allows room for the occasional spikes in demand to occur without noticeable performance penalties. During the system architecture design stage, understanding workload demands for system resources is critical to finding that optimal utilization balance (e.g., 70-80% utilization or some other defined threshold utilization). Caution is required when a system design results in under-provisioned resources—in such cases a typical workload demand will stress available resources to operate at 100% capacity for long periods of time. New tasks requiring these resources will be forced to wait in a queue for the resources to free-up, hence causing bottlenecks in operation and performance degradation on the system. Caution is also required when a system design results in over-provisioned resources—the maximum possible workload demand put upon such resources has little to no performance degradation on the operation of the SDDC system, but over-provisioned systems are costly to implement and result in wasting computing resources, energy, etc.

Designing SDDC infrastructure for P2 applications may be guided by the exploitation of tool sets made available by the application developers to assist with workload profiling and resource requirement identification processes. The nature of the resource requirements in such applications are well understood, and have been studied in great detail since the wide scale use of data center technology began.

More recently the challenge of workload profiling for SDDC implementations has become significantly more difficult. Applications and use-cases are deviating away from the typical operation of P2 applications. Application development is fast and application footprint is small, resulting in applications providing very specific functions. These applications are classified as P3 applications. Due to the nature of how they are developed, architects do not have the P2 equivalent tools required to provide knowledge or understanding of their workload demands. As such, solution architects are designing SDDC systems as best they can from the information provided by their customer.

Illustrative embodiments provide solutions that address the challenges faced in sizing P3 application workloads, and therefore provide the ability to optimally design an SDDC infrastructure to efficiently handle the workload demands put upon it. In some embodiments, the micro workload modeling framework 102 is tasked with generating a workload profile (e.g., resource consumption demand profiles for functional patterns) for an unknown application or workload. The workload profile may then be used by the micro workload modeling framework 102 for sizing calculations on an SDDC or other cloud infrastructure on which the unknown application or workload is scheduled to run (e.g., determining the resources required to support the demands of the unknown application or workload).

In some embodiments, historical workload data is correlated with resource consumption data based on application type, thus making it possible to predict resource consumption behavior even when historical evidence does not exist or is not sufficient enough to provide meaningful insight. Further, this allows for prediction of resource consumption behavior for existing and new workloads, operating as P2 or P3 type applications. The correlation between historical workload data and resource consumption data based on application type may be handled through the use of demand profiles and through historical evidence to design a platform solution capable of supporting such workloads under investigation.

Historical data may be used to provide an overall view of resource consumption of a named application, including CPU, memory, disk, network graphs, and other related resource areas or types. The application resource consumption can be viewed as individual data points over a time period, with averaging used to smooth or remove outliers. Various types of tools may be used to gather historical data for named applications. Examples of such tools include the Virtustream Advisor™, Virtustream xStream®, the VMware Capacity Planner™, the Dell Performance Analysis Collection Kit (DPACK), Unix System Activity Report (SAR) data, etc. The historical data may be based on the number of users, transactions, and various other parameters. In some embodiments, the historical data collected from various tools is standardized and normalized for use when compared with other platforms.

As noted above, IUs such as μVMs may be used to quantify resource consumption of CPU, memory, disk and network resources as a single normalized unit used in a managed services environment to standardize resource allocation blocks. The μWorkload concept used in some embodiments is complementary to the μVM or IU concept, and is used to model and quantify an application or workload in terms of normalized units that can be used to profile workloads from unknown applications.

The μWorkload concept may be described using the following example. Consider a segment of an application workload to be a unique functional pattern. Thus, the entire workload may be represented as a set of multiple functional patterns for its various segments. Some embodiments characterize segments based on historical resource consumption driven by a specific demand profile, and thus the micro workload modeling framework 102 is able to estimate how a particular segment will behave in conjunction with other segments to predict resource consumption behavior. In some embodiments, the micro workload modeling framework 102 performs refinement through the use of new data gathered from testing different demand profiles and different combinations of segments.

SDDC platform metrics, or other cloud computing infrastructure metrics, may be defined in terms of levels of interoperability. μWorkload modeling further expands on using levels by describing a workload in terms of μWorkloads which when combined make up the overall workload for an application.

Figure 3:
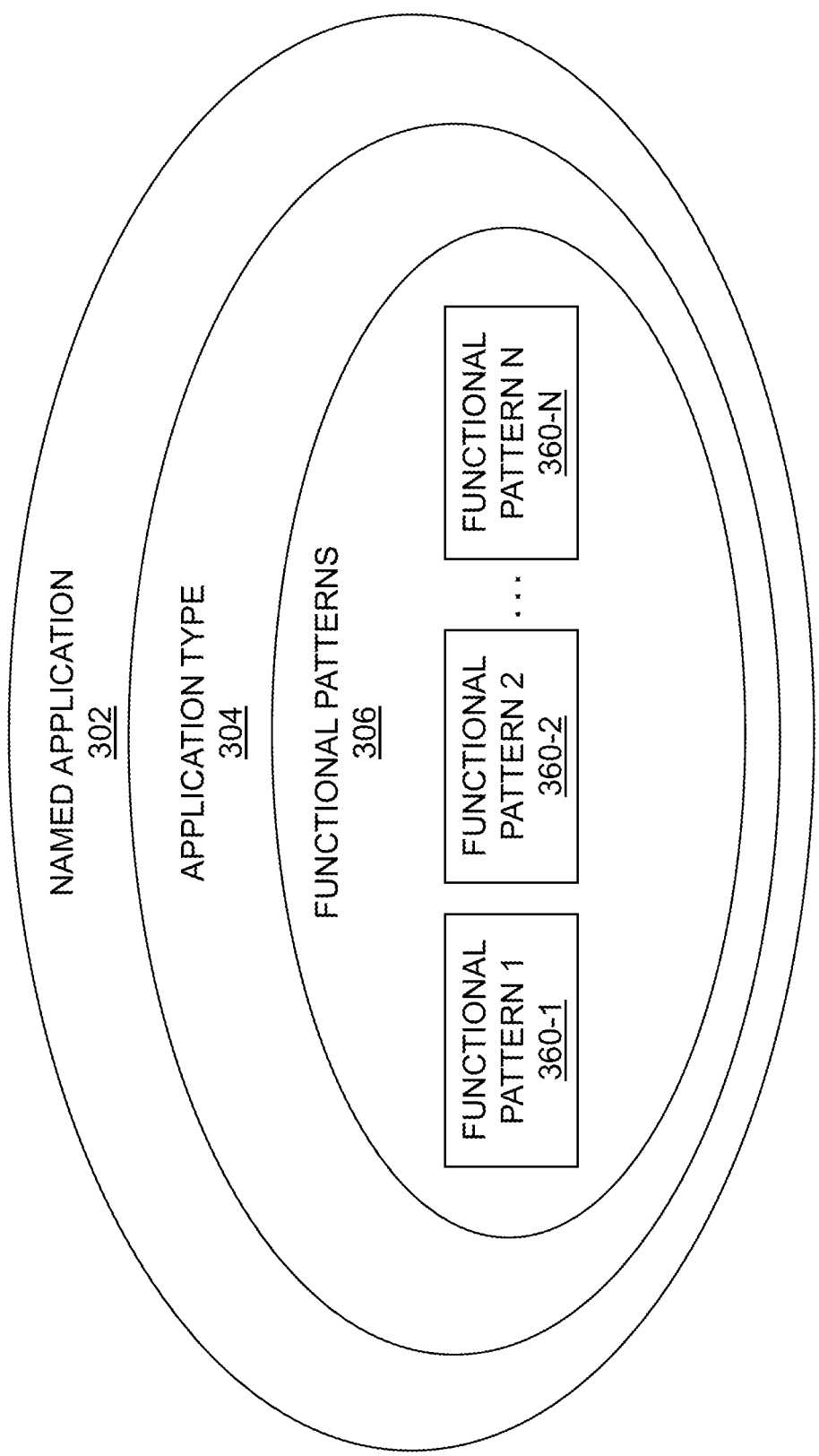
FIG. 3 shows relationships between named applications, application types, and functional patterns in an illustrative embodiment.

FIG. 3 illustrates how levels can be utilized to break a workload down into its constituent μWorkloads. FIG. 3 shows a hierarchy of named applications 302, their application types 304, and their associated functional patterns 306 (e.g., functional patterns 360-1, 360-2, . . . 360-N, collectively functional patterns 360). Before continuing, a brief discussion of various possible application types and functional patterns will be presented. It should be appreciated, however, that the particular application types and functional patterns described below are presented by way of example only, and that embodiments are not limited solely to use with these application types or functional patterns.

First, a set of example functional patterns will be described. Again, it is important to note that the following are only examples, and are not inclusive of all possible functional patterns. New functional patterns may evolve over time or be learned from a set of historical data.

1) Rich Internet Application—a functional pattern for applications that exploit rich internet application (MA) frameworks to make browser-based applications feel more like traditional "thick client" applications.

2) Straight Through Processing—a functional pattern that handles the execution of business processes with no or minimal (e.g., exception based) human intervention. This drives work through different stages, calling numerous tasks, applications and services in sequence depending on the nature of the "workflow" document. The workflow document is structured in a program-accessible manner. Rules and error paths are defined for the completion of the document. If an unexpected error occurs, it is queued for human intervention.

3) Administrative Workflow—a functional pattern that has multiple instances. As an example, a compliance management administrative workflow is designed to support user-oriented workflows, which involve manual activities such as reference data management approvals, or the integration of all steps in a new process.

4) Content Collaboration—a functional pattern that is typically used in team-based environments, with a collection of services to enable document creation.

5) Content Distributor—a functional pattern that is focused on the process of transforming content or documents to multiple configured output formats, with an end result of customized content from disparate parts that can be displayed, published or printed. The content distributor transforms and distributes a large amount of content and documents to multiple configured output formats for multiple internal and external consumers.

6) Numerical Processor—a functional pattern that specifies how to optimize numerical calculations such as risk, pricing, clash analysis, etc. Numerical Processors (NP) specialize in processing numerical tasks such as multiple iterations of an algorithm. NP are also utilized to perform calculations on large data sets with options for execution approach, Quality of Service (QoS) levels and scenario choices.

Next, a set of example application types will be described. Applications can be described using functional patterns to outline the basic operation of the applications. New application types may be identified as extensions to, or replacements of, one or more of the examples listed below. Thus, it should be appreciated that embodiments are not limited solely to use with the specific example application types presented below.

1) Business Intelligence—business intelligence applications augment the standard two-dimensional view of reports by allowing a user to compare rows within rows to columns within columns, thus effectively viewing multi-dimensional properties. Users can flip rows and columns, or invert the innermost columns or rows to the outermost and vice versa. As a result of these capabilities, this type of reporting is known as Online Analytical Processing (OLAP). OLAP is often used to create and house these and other views in an ad hoc manner, because the users have a lot of discretion over how to view the data. OLAP reporting can generate data and conclusions without the benefit of direct users through the use of programming techniques. Data is stored in a different manner than in a relational database managing system (RDMBS)—OLAP data may be stored in a multi-dimensional cube that often benefits from storage optimization. Business intelligence applications may also provide stored searches, and can perform historical trend analysis. Business intelligence applications may sometimes be combined with or provide data mining functions. An example functional pattern associated with the business intelligence application type is "Numerical Processor."

2) Collaborative Workspaces and Portals—collaboration workflow tools and portals are typically used in team-based environments, and provide a collection of services that are highly flexible and interactive, offering an environment for document development by multiple individuals. An example functional pattern associated with the collaborative workspaces and portals application type is "Content Collaboration."

3) Enterprise Content Management and Portals—enterprise content management applications are primarily concerned with business processes, including various controls and auditability around content production for electronic distribution. Such applications focus on the creation or modification of content from many sources within and external to a content management system (CMS). Such applications integrate with specific workflow processes to marshal the lifecycle of content and often include collaboration tools that augment a CMS environment with various document sharing and publishing services. This also includes discussion threads, and the ability to generate comments as part of an ad hoc process of content production, idea sharing, and task and content management. An example functional pattern associated with the enterprise content management and portals application type is "Content Distributor."

4) Unified Communications—unified communications applications are systems that can be defined as the integration of real-time communication systems (e.g., instant messaging, presence information, voice-over-IP (VOIP) telephony, video conferencing, data sharing, call control and speech recognition, etc.) with non-real-time communication services (e.g., unified messaging, integrated voicemail, email, short messaging system (SMS), fax, etc.) typically implemented over an enterprise service bus with elements of content collaboration for the backbone application function. An example functional pattern associated with the unified communications application type is "Content Collaboration."

5) Customer Relationship Management (CRM)—CRM applications provide systems designed to support management of customer relationships, which are similar to other administrative workflow systems. These systems will typically include user-oriented workflows, which involve manual activities such as reference data management approvals or the integration of all steps in customer or client based processes. It is expected that all assigned human collaborators can add or change supporting instructions or status reports, in forms such as documents, spreadsheets, or, in the case of CMSs, content fragments, and therefore strong auditing capabilities must be available. CRM uses administrative workflows as a key component, but CRM also contains a rich CRM database (DB) with a content management component. An example functional pattern associated with the CRM application type is "Administrative Workflow."

6) Engineering—engineering applications are designed to run computationally intensive numerical calculations for engineering purposes (e.g., heat transfer modeling, structural modeling, computational dynamics, electromagnetic field analysis, etc.). Engineering applications specialize in processing thousands to millions of numerical tasks, such as multiple iterations of an algorithm. These applications can perform calculations on large data sets with options for execution approach, QoS levels, and scenario choices. The performance characteristics of processing requirements in real-time, on-demand, or batch are elicited in the qualities and are not part of the canonical definition. An example functional pattern associated with the engineering application type is "Numerical Processor."

7) Enterprise Resource Management (ERM)—ERM systems integrate internal and external management information across an entire organization, embracing finance, accounting, manufacturing, sales and service, CRM, etc. Typically referred to as ERM or enterprise resource planning (ERP) systems, such applications automate this activity with an integrated software application with a purpose of facilitating the flow of information between all business functions inside the boundaries of the organization and managing the connections to outside stakeholders. ERM or ERP applications run a variety of hardware and network configurations, typically employing a database as a repository for information. ERP often uses components from 4-5 individual applications such as: straight-through processors; gateways; Extract, Transform, Loads (ETLs); numerical processors; and portal servers. An example functional pattern associated with the ERM application type is "Straight Through Processing."

8) Financial—financial management systems are designed to support management of financial and economic information in a workflow orientation, which are similar to other administrative workflow systems. Financial management systems will typically include user-oriented workflows, which involve manual activities such as financial reference data management, budgetary information, financial approvals, or the integration of all steps in auditing, ledger or bookkeeping based processes. It is expected that all assigned human collaborators can add or change supporting instructions or status reports, in various forms including but not limited to documents, spreadsheets, or, in the case of CMSs, content fragments. As a result, strong auditing capabilities should be available. An example functional pattern associated with the financial application type is "Administrative Workflow." In some cases, components from applications such as straight-through processors may be leveraged in addition to administrative workflow application components for financial applications.

9) Simulation or Analytics—simulation or analytics applications are designed to run computationally intensive numerical calculations (e.g., risk analysis, pricing analysis, etc.). These applications may specialize in processing thousands to millions of numerical tasks, such as multiple iterations of an algorithm. Simulation or analytics applications can perform calculations on large data sets with options for execution approach, QoS levels, and scenario choices. The performance characteristics of processing requirements in real-time, on-demand, or batch are elicited in the qualities and are not part of the canonical definition. An example functional pattern associated with the simulation or analytics application type is "Numerical Processor."

10) Supply Chain Management (SCM)—SCM systems may be used to manage a network of interconnected businesses involved in the ultimate provisioning of product and service packages made available to customers or other end users. SCM spans all movement and storage of raw materials, work-in-process inventory, and finished goods from the point of origin to the point of consumption (e.g., the supply chain). SCM systems are widely used, and involve various disparate applications including but not limited to inventory control, package management, billing, invoicing, etc. An example functional pattern associated with the SCM application type is "Straight Through Processing."

11) Real time media streaming—real time media streaming applications are responsible for streaming data content (e.g., with a focus on audio and video content) that is stored and distributed for commercial or other access. A key scope item for many real time media reference repositories is to prevent tampering and copyright infringement, and to report attempts to violate such measures. The security aspects are covered in the qualities definitions and are not part of the canonical definition of this application type. An example function pattern associated with the real time media streaming application type is "Rich Internet Application."

12) Social networking—social networking applications are typically responsible for streaming data content that may include common dictionaries, user access data, key historical data, audio and video content, etc., in addition to heterogeneous files and logs from many applications that need to be stored and retrieved for social, regulatory and legal purposes. A key scope item for many social networking repositories is to prevent tampering and copyright infringement, and to report attempts to violate such measures. The security aspects are covered in the qualities definitions and are not part of the canonical definition of this application type. An example functional pattern associated with the social networking application type is "Rich Internet Application."

13) Stored media streaming distribution—stored media streaming distribution applications are typically responsible for streaming data content, with a focus on audio and video content, which is stored and distributed for commercial or other access. A key scope item for many stored media streaming repositories is to prevent tampering and copyright infringement, and to report attempts to violate such measures. The security aspects are covered in the qualities definitions and are not part of the canonical definition of this application type. An example functional pattern associated with the stored media streaming distribution application type is "Rich Internet Application."

While various functional patterns are described as being associated with the above example application types, it should be appreciated that in other embodiments different functional patterns may be associated with these and other application types. In addition, one or more of the above application types may be combined into a single application type or may be separated into multiple distinct application types, possibly based on analysis of the historical data available for a particular use case scenario. Further, various other application types may be used in other embodiments, including application types that are learned from the historical data available for a particular use case scenario.

Returning to FIG. 3, assume that an unknown workload is a messaging system mapped to a named application 302 of a Microsoft® Exchange Server. The application type 304 for this named application may be communications, representing the primary function of an Exchange Server application. The functional patterns 306 used within the communications application type 304 may include Content Collaboration 360-1, Rich Internet Application 360-2 and Content Distributor 360-3.

Figure 4:
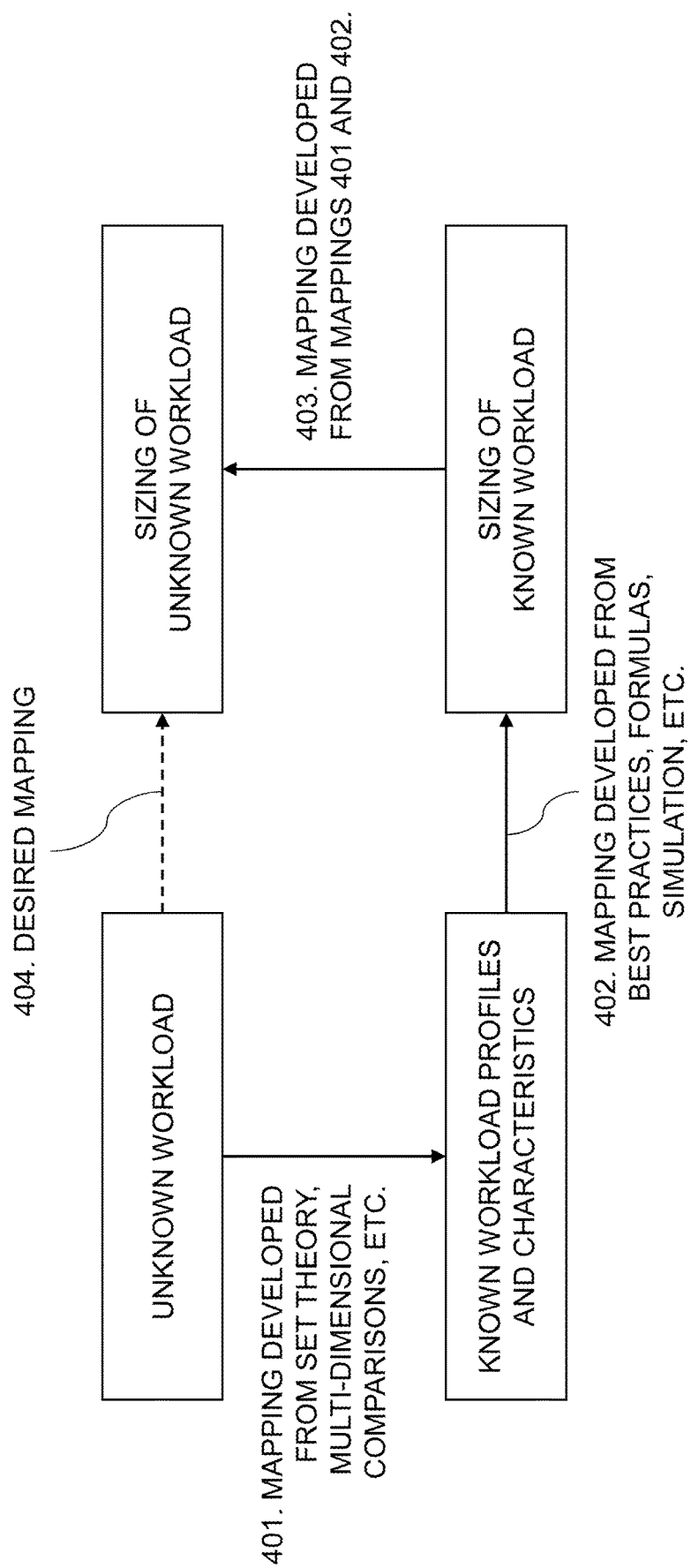
FIG. 4 illustrates sizing of unknown workloads in an illustrative embodiment.

Understanding the workload makeup for a named application allows for the workload of an unknown application to be determined by identifying common functional patterns and using their associated µWorkload patterns to build an overall workload profile for the unknown application. FIG. 4 illustrates this process, where it is desired to find a mapping 404 between an unknown workload and the sizing of the unknown workload (e.g., in terms of µWorkloads). First, the unknown workload is mapped 401 to one or more known workload profiles and characteristics, possibly including hierarchies of services provided by such known workload profiles. The mapping 401 may be developed from set theory, using multi-dimensional characteristics, etc. Next, the known workload profiles and characteristics are mapped 402 to the sizing of the known workload (e.g., in terms of µWorkloads). The sizing of the known workload may include hierarchies of resources consumed or utilized by applications with the known workload profiles and characteristics as determined from historical data. The mapping 402 may be developed from best practices, formulas, simulations, etc. The sizing of the known workload is then used to develop a mapping 403 to a size of the unknown workload using mappings 401 and 402. Thus, the desired mapping 404 is determined using mappings 401, 402 and 403.

The ability to utilize a "regression to the known," or breaking an unknown workload into a series of known functional patterns, provides many benefits to the challenges faced when trying to design and allocate resources to an unknown application or workload type. These benefits include: developing a common language of recursive workload service requirements based on experience; providing an ability to fine-tune a view of workloads, including mixed workloads, in hierarchical fashion; focusing attention on areas of contention; untangling resource dependences (e.g., where CPU determines memory, so one may be over-allocated); examining effective capacity and utilization; providing context to determine metric mapping models (e.g., named levels, 1:n, n:1 and m:n mappings, etc.). These benefits provide tangible and real-world improvements in a SDDC or other cloud computing infrastructure through more efficient use of compute, storage and networking resources, through reduced energy consumption or avoiding wasted energy consumption, etc.

As discussed above, embodiments may utilize a set of application types and functional patterns for µWorkload modeling. In this way, a given application can be described using functional patterns that outline basic operation of the application. The functional patterns describe resource structures required to implement various components or functionality for an application workload. Functional patterns may be organized by the scale of the patterns used for an application workload. A functional pattern may define a workload component in terms of a basic operation of the application it is part of. Multiple functional patterns may be combined to create an application. This can be done as subroutines, microservices or other mechanisms for building an application or workload profile.

In utilizing functional patterns, some embodiments look at unit of work appearance. As an example, some embodiments may look at unit of work appearance measured as low, medium, and high. This can be expanded for greater granularity in other embodiments, but is not a requirement.

A workload profile for 200 users can be broken down into a unit measure for a single user. The same can apply for a workload profile for 2000 users, or any other desired number of users. The unit measure for a single user may similarly be expanded up to any desired number of users. A correction factor is applied in some embodiments, however, to allow for user density resource allocation complexity. Consider, for example, that a workload profile for 2000 users may have increased resource contention that has a domino effect on other resources. This can be shown where IO contention drives CPU spikes due to context switching by the application and operating system.

In reverse, some embodiments identify features used by a new or unknown workload (e.g., which has no historical telemetry data). A known application with similar features is then identified (e.g., using a nearest neighbor algorithm or another suitable technique). This allows for reconstructing the workload, applying per user considerations, and determining the unknown workload requirements. This allows for comparing unknown workloads developed in-house, which may be P3 workloads, with known workloads to get an approximate workload profile for the new or unknown workloads.

There is a need to define start and end viewpoints for driving algorithms in some embodiments. For example, a determination should be made as to whether to focus on the top level application or on the functional patterns that make up the workload. Since a workload may be represented as a set of features, this leads to three-dimensional sets when dealing with multiple workloads and functional patterns. Transferring workloads across levels will require a transform function derived from the knowledge of known applications. This supports mapping of a workload through multiple levels.

Figure 5:
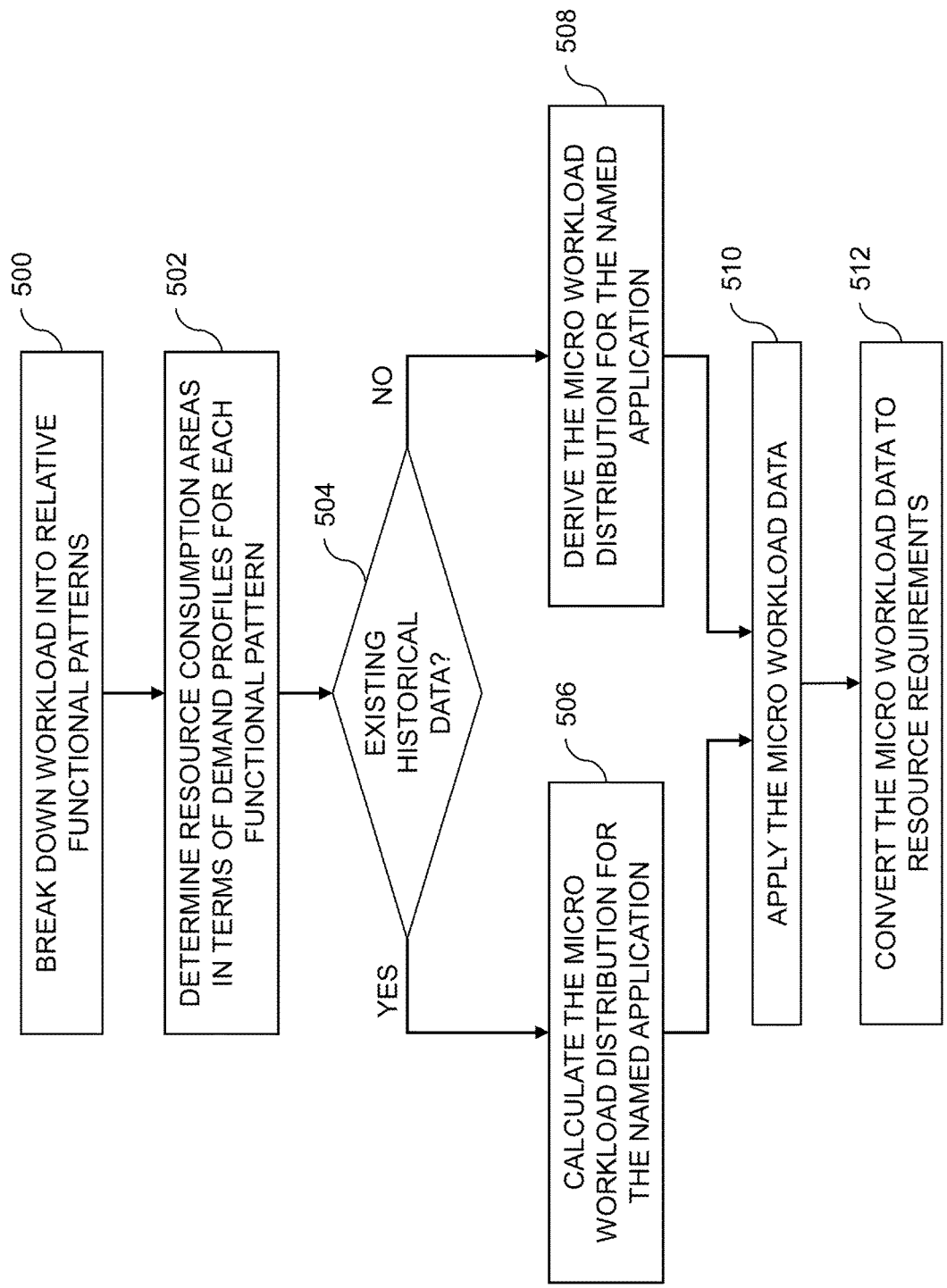
FIG. 5 is a flow diagram of another exemplary process for modeling of micro workloads and their associated resource consumption in an illustrative embodiment.

A micro workload modeling workflow will now be described with respect to the flow diagram of FIG. 5. The FIG. 5 process includes steps 500 through 512, and may be performed using the micro workload modeling framework 102. The FIG. 5 process may be used for modeling workloads and their associated resource consumption, where the workloads are defined as sets of functional patterns combined to create an application. In step 500, an application or unknown workload is broken down into its relative functional patterns. In step 502, resource consumption areas are determined in terms of demand profiles (which may include distributions, averages, peaks, resource overhead, etc.) for each functional pattern of the application.

A determination is made in step 504 as to whether historical resource consumption data exists for the resource consumption areas or demand profiles determined in step 502 (e.g., determining whether there are named applications with similar resource consumption areas or demand profiles and for which historical data is available).

If the result of the step 504 determination is yes (e.g., that historical resource consumption data exists), the process continues with step 506, calculating the μWorkload distribution for the named application or applications. Step 506 may include calculating temporal intervals, μWorkload distributions, averages, peaks, resource overhead, etc. If the result of the step 504 determination is no (e.g., that historical resource consumption data does not exist), the process continues with step 508, where the μWorkload distribution is derived from similar known applications, including deriving temporal intervals, μWorkload distributions, averages, peaks, resource overhead, etc.

In step 510, the μWorkload data (e.g., historical as calculated in step 506 or derived from step 508) is applied. The μWorkload data is then converted in step 512 to a set of resource requirements for the new or unknown workload or application.

There are various factors that may affect the accuracy of modeling micro workloads and their associated resource consumption. For example, the accuracy of sample sets and historical data (e.g., with regards to the number of users, transactions, underlying hardware normalized to an IU or μVM concept, etc.) can affect modeling. Further, the accuracy of time windows and the accuracy of measurement tools used for obtaining historical data can affect modeling.

Micro workload modeling may be used to drive solutions for various application areas and use cases, including but not limited to engineering, sales, services, support, marketing, competitive analysis, etc. The approaches for micro workload modeling described herein further provide benefits in platform design, workload placement, workload design, and predictions on the behavior of combinations of workloads. In these and other use case scenarios, micro workload modeling may provide benefits in a variety of tasks including developing new hardware platforms for SDDCs, cloud computing infrastructures, physical infrastructures, etc., developing customer solutions, deploying solutions with a customer, root cause analysis, response to competitors, supporting material for new products in development, etc. Micro workload modeling provides benefits in features such as workload profiles, architecture and design, configuration reduction, sizing and performance prediction, sensitivity analysis, reconfiguration, translation of metrics, translation of workload specifications, new model generation, performance analysis, sizing model accuracy, placement and movement of workloads, bottleneck analysis, continuous quality improvement, interoperability of tools, etc.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Virtustream Enterprise Cloud, Google Cloud Platform (GCP) and Microsoft Azure. The cloud-based systems can include object stores such as Virtustream Storage Cloud, Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. For example, containers may run on physical hardware. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
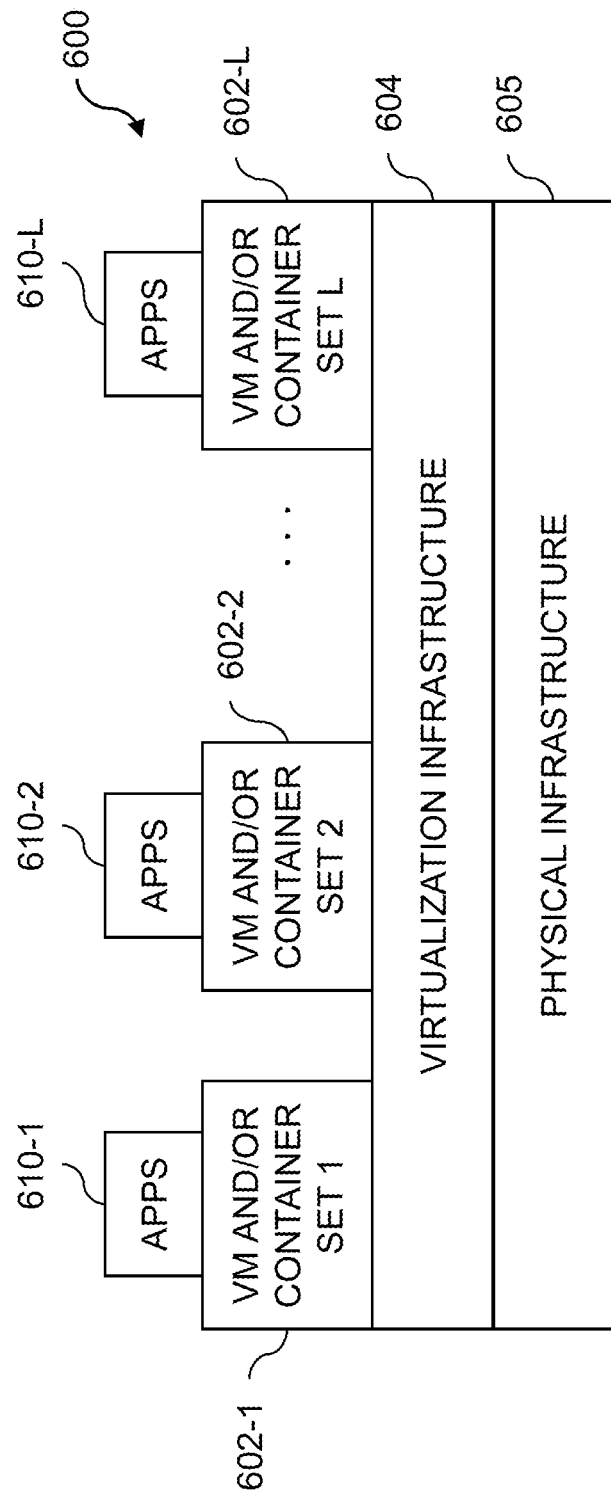

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for micro workload modeling and resource allocation of the type described above for one or more processes running on a given one of the VMs. For example, each of the VMs can implement such functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide functionality for micro workload modeling and resource allocation of the type described above for one or more processes running on different ones of the containers. For example, a container host device supporting multiple containers of one or more container sets can implement one or more instances of such functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a GPU, TPU, video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for micro workload modeling and resource allocation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, resource consumption metrics, application types, functional patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
selecting a given workload, the given workload being associated with at least one application type;
analyzing the given workload to determine a set of functional patterns, the set of functional patterns describing resource structures for implementing functionality of the at least one application type;
determining resource consumption demand profiles for each of the set of functional patterns;
determining micro workload distributions for each of the resource consumption demand profiles, a given one of the micro workload distributions comprising a number of micro workloads, each micro workload comprising a normalized unit of resource consumption metrics;
converting the micro workload distributions for each of the resource consumption demand profiles into a set of resource requirements for running the given workload on an information technology infrastructure; and
allocating resources of the information technology infrastructure to the given workload based on the set of resource requirements;
wherein the method is performed by at least one processing device comprising a processor coupled to a memory.

2. The method of claim 1 wherein selecting the given workload further comprises determining the at least one application type utilizing a multi-level hierarchy, the multi-level hierarchy comprising a first level for known applications, a second level characterizing relationships between the known applications and one or more application types representing functionality of the known applications, and at least a third level characterizing relationships between the one or more application types and one or more sets of functional patterns used within the one or more application types.

3. The method of claim 2 wherein analyzing the given workload to determine the set of functional patterns comprises mapping the given workload to a given one of the known applications in the first level of the multi-level hierarchy, and determining the functional patterns by mapping the given known application in the first level of the multi-level hierarchy to at least a given application type in the second level of the multi-level hierarchy and selecting a set of functional patterns in the third level of the multi-level hierarchy associated with the given application type in the second level of the multi-level hierarchy.

4. The method of claim 2 wherein the application types in the second level of the multi-level hierarchy comprise two or more of: business intelligence; collaborative workspaces and portals; enterprise content management and portals; unified communications; customer relationship management; engineering; enterprise resource management; financial; simulation and analytics; supply chain management; real time media streaming; social networking; and stored media streaming distribution.

5. The method of claim 2 wherein the functional patterns in the third level of the multi-level hierarchy comprise two or more of: rich internet application; straight through processing; administrative workflow; content collaboration; content distributor; and numerical processor.

6. The method of claim 1 wherein determining the resource consumption demand profiles comprises, for a given one of the resource consumption demand profiles, selecting a unit-based resource consumption demand profile and a correction factor for scaling the unit-based resource consumption demand profile to account for a number of units utilized by the given workload.

7. The method of claim 6 wherein the units comprises users of a given application corresponding to the given workload, and the correction factor scales user-based resource consumption demand profiles to account for user density resource allocation complexity.

8. The method of claim 1 wherein determining the micro workload distributions comprises:
mapping the given workload to a given known application;
determining micro workload data for the given known application; and
applying the micro workload data for the given known application to determine the micro workload distributions for the given workload.

9. The method of claim 8 wherein mapping the given workload to the given known application comprises:
determining one or more features of the given workload;
comparing the one or more features of the given workload with respective sets of features of a set of known applications; and
identifying the given known application as a selected one of the set of known applications having a set of features similar to the one or more features of the given workload.

10. The method of claim 8 wherein determining the micro workload data for the given known workload comprises:
responsive to determining that historical data exists for the given known application, calculating micro workload distributions for the given known application from the historical data; and
responsive to determining that historical data does not exist for the given known application, deriving micro workload distributions for the given known application from historical data for one or more other known applications determined to be similar to the given known application.

11. The method of claim 1 wherein the normalized unit of resource consumption metrics comprises normalized units of compute, storage, memory, memory bandwidth and network bandwidth resource consumption.

12. The method of claim 11 wherein the normalized units of compute, storage, memory, memory bandwidth and network bandwidth resource consumption are selected to provide a specified average resource utilization of compute, storage, memory, memory bandwidth and network bandwidth resources of the information technology infrastructure.

13. The method of claim 1 wherein the given workload is associated with an unknown application for which historical resource consumption data is not available.

14. The method of claim 13 wherein the unknown application comprises a new workload built for at least one of cloud, social, mobile and physical hardware infrastructure deployment.

15. A computer program product comprising a non-transitory processor-readable storage medium having stored therein program code of one or more software programs, wherein the program code when executed by at least one processing device cause the at least one processing device:
to select a given workload, the given workload being associated with at least one application type;
to analyze the given workload to determine a set of functional patterns, the set of functional patterns describing resource structures for implementing functionality of the at least one application type;
to determine resource consumption demand profiles for each of the set of functional patterns;
to determine micro workload distributions for each of the resource consumption demand profiles, a given one of the micro workload distributions comprising a number of micro workloads, each micro workload comprising a normalized unit of resource consumption metrics;
to convert the micro workload distributions for each of the resource consumption demand profiles into a set of resource requirements for running the given workload on an information technology infrastructure; and
to allocate resources of the information technology infrastructure to the given workload based on the set of resource requirements.

16. The computer program product of claim 15 wherein determining the resource consumption demand profiles comprises, for a given one of the resource consumption demand profiles, selecting a unit-based resource consumption demand profile and a correction factor for scaling the unit-based resource consumption demand profile to account for a number of units utilized by the given workload.

17. The computer program product of claim 15 wherein the normalized unit of resource consumption metrics comprises normalized units of compute, storage, memory, memory bandwidth and network bandwidth resource consumption selected to provide a specified average resource utilization of compute, storage, memory, memory bandwidth and network bandwidth resources of the information technology infrastructure.

18. An apparatus comprising:
at least one processing device comprising a processor coupled to a memory;
the at least one processing device being configured:
to select a given workload, the given workload being associated with at least one application type;
to analyze the given workload to determine a set of functional patterns, the set of functional patterns describing resource structures for implementing functionality of the at least one application type;
to determine resource consumption demand profiles for each of the set of functional patterns;
to determine micro workload distributions for each of the resource consumption demand profiles, a given one of the micro workload distributions comprising a number of micro workloads, each micro workload comprising a normalized unit of resource consumption metrics;
to convert the micro workload distributions for each of the resource consumption demand profiles into a set of resource requirements for running the given workload on an information technology infrastructure; and
to allocate resources of the information technology infrastructure to the given workload based on the set of resource requirements.

19. The apparatus of claim 18 wherein determining the resource consumption demand profiles comprises, for a given one of the resource consumption demand profiles, selecting a unit-based resource consumption demand profile and a correction factor for scaling the unit-based resource consumption demand profile to account for a number of units utilized by the given workload.

20. The apparatus of claim 18 wherein the normalized unit of resource consumption metrics comprises normalized units of compute, storage, memory, memory bandwidth and network bandwidth resource consumption selected to provide a specified average resource utilization of compute, storage, memory, memory bandwidth and network bandwidth resources of the information technology infrastructure.

* * * * *